United States Patent [19]
Douklias

[11] 3,776,616
[45] Dec. 4, 1973

[54] COHERENT OPTICAL MULTICHANNEL CORRELATOR

[75] Inventor: Nikolaos Douklias, Munich, Germany

[73] Assignee: Siemens Aktiengesellschaft, Berlin and Munich, Germany

[22] Filed: Oct. 10, 1972

[21] Appl. No.: 295,998

[30] Foreign Application Priority Data
Nov. 22, 1971 Germany.................. P 21 578 75.6

[52] U.S. Cl............................. 350/162 SF, 356/71
[51] Int. Cl. ............................................. G02b 5/18
[58] Field of Search ................. 350/162 SF; 356/71

[56] References Cited
UNITED STATES PATENTS
| | | | |
|---|---|---|---|
| 3,597,069 | 8/1971 | Heinonen, Jr. ................ | 350/162 X |
| 3,644,019 | 2/1972 | Bestenreiner et al.............. | 350/162 |
| 3,671,106 | 6/1972 | Groh.................................. | 350/162 |
| 3,703,640 | 11/1972 | Broussaud et al. ............. | 350/162 X |

Primary Examiner—William F. Lindquist
Attorney—Benjamin H. Sherman et al.

[57] ABSTRACT

A coherent optical multichannel correlator having a plurality of channels of coherent light beams for permeating an object to be identified, a Fourier transmission lens receiving the light permeating the object, a number of filter holograms disposed on a focal plane of the transformation lens and one or more photo detectors for receiving the output of the filter holograms characterized by providing a matrix of controllable optical switches between the Fourier transformation lens and the photo detectors for sequentially blocking and passing selected channels to reduce background noise from cross correlation of adjacent channels. The matrix of optical switches can be an arrangement of mechanically actuated light shutters or a matrix of electro-optical polarization switches.

7 Claims, 1 Drawing Figure

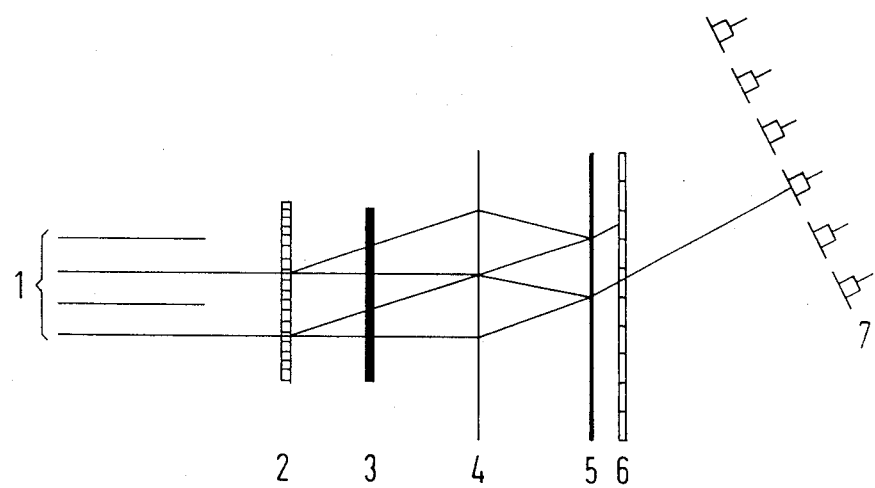

COHERENT OPTICAL MULTICHANNEL CORRELATOR

BACKGROUND OF THE DISCLOSURE

1. Field of the Invention

The present invention relates to a coherent optical multichannel correlator utilizing a plurality of coherent light beams as channels for illuminating an object which is to be examined, a Fourier transformation lens, a number of filter holograms and several photo detectors.

2. Prior Art

For the automatic recognition of a two-dimensional symbol or character such as an alpha-numeric sign, it has been suggested to use coherent optical correlators which have a source of coherent light, such as a laser, means for supporting the symbols on one focal plane of a Fourier transformation lens and a spatial filter, such as filter hologram located in the opposite focal plane. The coherent light, which permeates the symbol and is focused by the transformation lens, produces an object wave, and, when this object wave coincides with the object wave of the hologram filter, a reference wave or beam is reconstructed to provide a useful recognition signal. For a recognition of a two-dimensional sign, a certain tolerance range is required in the signal input plane for the position coordinance of the sign to obtain the recognition signal which is an auto-correlation signal. The holographic matched filters provide an increase of tolerances for translational variations for the position coordinator of the object to be identified and the holographic correlation is translational invariant. However, rotational variations in the coordination of the objects requires a recognition system utilizing a multichannel correlator.

The term "translation invariant" means the auto-correlation signal incurs independent from the shifting of the signs in a holographic correlator. However, it does not mean that the signal is produced in the detector plane in the same place and the position for the maximum of the auto-correlation signal changes with the changes in the position of the sign. The size of the detector element thus depends not only on the diameter of the auto-correlation signal but also on possible shiftings of the position of the signal due to shifting in the position of the sign in the input plane.

With a parallel evaluation of all channels of a multichannel correlator, all combinations of each sign with each filter will be produced in the detector plane as correlation signal. An unfavorable signal to interference ratio or signal to noise ratio is produced when the amounts of adjacent cross-correlation terms which occur during parallel evaluation are superimposed on the auto-correlation maximum. In order to obtain a good signal separation from the interference signal or noise signal while simultaneously providing filter readiness of all filters, an expensive detector matrix which is adapted to a multiple of correlation fields is required.

A coherent optical multichannel correlator with a high signal to noise ratio is discussed in the copending United States patent application, Ser. No. 252,022, which was filed on May 10, 1972, and the correlator utilized a modulator which enabled a sequential modulation of the carrier frequency. This multichannel correlator has certain drawbacks in that the modulator included mechanically moving parts which have a certain inertia. Furthermore, an exact positioning of the mechanical moving parts for each of the individual channels requires an expensive alignment process. Inexact alignment between the parts and the individual channels will cause fluctuations in the recognition signal which fluctuations will render a signal identification very difficult.

SUMMARY OF THE INVENTION

The present invention is directed to providing a coherent optical multichannel correlator which allows a fast and precise sequential control of the channels without the losing of the advantages of the multichannel correlators. The correlator comprises means for providing a plurality of beams of coherent light for permeating an object to be identified, a Fourier transformation lens for receiving the beams of light after permeating the object being identified, a plurality of filter holograms located on the focal point of the lens, optical sensing means for sensing reconstructed reference waves from the filter holograms and a controllable means for selectively blocking and passing the beams of coherent light which controllable means is disposed between the lens and the optical sensing means. The means for providing the multiple beams preferably comprises a single source of coherent light and an optical diffraction grating which separates the light from the single source into multiple beams. The controllable means for blocking and passing is preferably an optically switching arrangement and comprising a matrix of optical switches with each switch having a dimension for the corresponding dimensions of the channel and being associated with the channel of coherent radiation. In one embodiment of the invention, the optical switches are mechanically actuated shutters. To provide a high speed in sequentially determining the output of each of the hologram filters, the switching matrix is preferably a plurality of electro-optical polarization switches and the means providing a plurality of coherent light beams provides polarization of the beams of the coherent light. The use of electro-optical switches has an additional advantage of no moving parts.

BRIEF DESCRIPTION OF THE DRAWING

The FIGURE is a schematic illustration of an embodiment of the present invention.

DESCRIPTION OF THE PREFERRED EMBODIMENT

The principles of the present invention are particularly useful for a multichannel correlator illustrated in the FIGURE. The multichannel correlator utilizes a monochromatic coherent light beam 1, such as produced by a laser, which is passed through a diffraction grating 2 which produces a plurality of plane, coherent beams or channels of light which permeates an object 3 which is to be examined. A Fourier transformation element such as lens 4 is arranged next to the object 3 so that the object 3 is in a first focal plane thereof. A plurality of hologram filters are arranged as a matrix 5 in the second focal plane of the lens 4 to receive the light therefrom. Each of the hologram filters coacts with one of the multiple beams to provide a correlation channel and each hologram filter is constructed in such a way that the reference wave which is produced during auto-correlation is focused on an optical sensing means 7 which is illustrated as laterally arranged or offset thereto. As illustrated, the optical sensing means may include a plurality of photo-detectors with each detector being positioned to receive a reference wave from an individual filter hologram in the matrix 5 of filter holograms.

To prevent an unfavorable signal to interference ratio or signal to noise ratio due to the superimposition of cross-correlation terms of adjacent filters on the auto-correlation maximum, a controllable means 6 for sequentially blocking and passing the selected channels is provided between the means for sensing 7 and the lens 4. As illustrated, the means 6 for sequentially blocking and passing is a matrix of optical switches with each of the switches being of a dimension corresponding to the dimension of a channel from a diffraction grating 2 and associated therewith. Thus the matrix 6 can be arranged either ahead or behind the matrix 5 of hologram filters. As illustrated, the matrix 6 is located in a position to block or pass selected reconstructed reference waves from the holograms of matrix 5. The switches of the matrix 6 are sequentially actuated by means to enable the sequential determination of the output of the filter holograms in the matrix 5. By utilizing electro-optical polarization switches which are controlled by electronic means, a fast sequential determination of the outputs of all of the filter holograms can be obtained. When electro-optical polarization switches are utilized, the light beams permeating the object to be identified must be polarized which is accomplished by providing the polarization means either with the laser of the source or in the beam path therefrom. If very high speeds are not demanded, the role or function of the optical switches can be performed by correspondingly dimensioned optical shutters such as mechanically actuated rotating apertures. In either embodiment of the switches, the means controlling the operation of the switch is synchronized with the means evaluating the output of the sensing means 7 in a conventional manner.

The evaluation by the sensing means 7 during the parallel optical maximum processing of several signs is generally effected sequentially. However, a certain time is required for completing an evaluation due to the switching time for the optical switch arrangements. Since no amount of cross-correlation factors can become recognizable in an interfering manner at the place of the auto-correlation maximum, the degree of efficiency of the entire arrangement during the sequential signal processing is essentially higher than with the parallel signal processing in spite of the utilization of a simple detector matrix for the sensing means.

When the matrix 6 utilizes electro-optical switches, all mechanical moving parts will be eliminated. Furthermore, the switching time of the individual switches can be lowered in such a way that they do not have any limiting effect on an electrical evaluation means or system, which receives the output of the sensing means, during the evaluation of the recognition signals.

Since the available light intensity from the single source is simultaneously fanned out or spread over several channels, the intensity of light available in each of the individual channels is anticipated to be smaller than the intensity of the light in a single channel operation. To compensate for this, it is suggested that either the photo-detectors of the matrix 7 have a high sensitivity or the light source be provided by a laser having a higher output intensity.

Although various minor modifications might be suggest by those versed in the art, I wish to incorporate within the scope of the patent granted hereon all such variations and modifications that reasonably come within my contribution to the art.

I claim:

1. A coherent optical multichannel correlator for identifying objects comprising: means for providing a plurality of beams of coherent light as channels for permeating an object to be identified; a Fourier transformation lens for receiving the beams of light after permeating the object to be identified, a plurality of filter holograms located on the focal plane of the lens, optical sensing means arranged for receiving reconstructed reference waves from the filter holograms, and controllable means for sequentially blocking and passing the beams of coherent light, said controllable means being disposed between the lens and the optical sensing means so that the optical sensing means sequentially senses the reconstructed waves of selected hologram filters.

2. A coherent optical multichannel correlator according to claim 1, wherein the controllable means for sequentially blocking and passing comprises a matrix of optical switch elements with each switch element having a dimension for a channel of the coherent light, and said switch elements being arranged with a switch element associated with each of the channels.

3. A coherent optical multichannel correlator according to claim 1, wherein the controllable means for sequentially blocking and passing comprises a matrix of optical shutters which are mechanically operated with an optical shutter associated with each of the channels.

4. A coherent optical multichannel correlator according to claim 3, wherein the matrix of optical shutters is disposed between the hologram filters and the sensing means so that the reconstruction wave from each hologram filter is sequentially passed to the sensing means.

5. A coherent optical multichannel correlator according to claim 1, wherein the means for providing a plurality of light beams includes means for polarizing each of the beams and wherein the controllable means for sequentially blocking and passing the light includes a matrix of individually controllable electro-optical polarization switches with a switch associated with each of the channels.

6. A coherent optical multichannel correlator according to claim 5, wherein the matrix of electro-optical polarization switches is disposed between the hologram filters and the sensing means so that the reconstructed wave from each of the filter holograms is sequentially passed to the sensing means.

7. A coherent optical multichannel correlator according to claim 1, wherein the means for providing a plurality of beams with coherent light comprises a source producing a beam of coherent light and an optical diffraction grating receiving the beam of light and diffracting it into a plurality of coherent beams.

* * * * *